United States Patent [19]

Moreno et al.

[11] Patent Number: 4,913,707
[45] Date of Patent: Apr. 3, 1990

[54] AUTOMATED ASSEMBLY APPARATUS

[75] Inventors: Pat F. Moreno, Roswell, Ga.; Robert H. Lewis, Cary, N.C.; Robert G. MacIvergan, Wilmington, N.C.; Harold B. King, Jr., Wrightsville Beach, N.C.

[73] Assignee: General Electric Company, San Jose, Calif.

[21] Appl. No.: 270,006

[22] Filed: Dec. 2, 1988

[51] Int. Cl.⁴ .................. G21C 21/00; B23P 19/00
[52] U.S. Cl. .................................. 29/792; 29/723; 29/797; 376/260
[58] Field of Search .............. 376/260, 261, 463; 29/160, 430, 446, 450, 451, 469, 525.1, 742, 792, 797, 723

[56] References Cited

U.S. PATENT DOCUMENTS

| | | | |
|---|---|---|---|
| 3,858,297 | 1/1975 | Scholin et al. | 29/797 |
| 3,890,196 | 6/1975 | Chetter | 376/441 |
| 4,177,548 | 12/1979 | Yarick et al. | 29/797 |
| 4,178,672 | 12/1979 | Amico et al. | 29/797 |
| 4,203,206 | 5/1980 | Morris et al. | 29/742 |
| 4,449,294 | 5/1984 | Gunter | 29/792 |
| 4,508,679 | 4/1985 | Matzner et al. | 376/438 |
| 4,524,596 | 6/1985 | Tsunekawa et al. | 29/792 |
| 4,587,704 | 5/1986 | Matzner et al. | 29/446 |

Primary Examiner—Daniel Wasil
Attorney, Agent, or Firm—Robert R. Schroeder

[57] ABSTRACT

To assemble nuclear fuel bundle spacers comprised of a multiplicity of rod-positioning ferrules, automated apparatus is provided comprising an indexing table mounting a plurality of identical, angularly spaced ferrule fixtures which are successively positioned at a first station for receipt of a pair of properly oriented ferrules. The table is indexed to present the ferrule pairs in turn to a second station where a spring is loaded in preassembly relation thereto. At the next table index position, a third station manipulates the successive fixture-mounted ferrule pairs to interlock the spring with each ferrule pair as a subasssembly which is then indexed in turn to a fourth station for assembly into a spacer fixture.

19 Claims, 15 Drawing Sheets

AUTOMATED ASSEMBLY APPARATUS

BACKGROUND OF THE INVENTION

Nuclear power reactors are a well known source of energy. In one type of nuclear reactor the nuclear fuel is comprised of elongated rods formed of sealed cladding tubes of suitable material, such as zirconium alloy, containing uranium oxide and/or plutonium oxide as the nuclear fuel. A number of these fuel rods are grouped together and contained in an open-ended tubular flow channel to form a separately removable fuel assembly or bundle. A sufficient number of these fuel bundles are arranged in a matrix, approximating a right circular cylinder, to form the nuclear reactor core capable of self-sustained fission reaction. The core is submerged in a fluid, such as light water, which serves both as a coolant and as a neutron moderator.

A typical fuel bundle is formed by an array of spaced fuel rods supported between upper and lower tie plates; the rods typically being in excess of ten feet in length, on the order of one-half inch in diameter and spaced from one another by a fraction of an inch. To provide proper coolant flow past the fuel rods it is important to maintain the rods in precisely controlled, spaced relation such as to prevent bowing and vibration during reactor operation. A plurality of fuel rod spacers are thus utilized at spaced intervals along the length of the fuel bundle for this purpose.

Design considerations of such fuel rod bundle spacers include the following: retention of rod-to-rod spacing; retention of fuel bundle shape; allowance for fuel rod thermal expansion; restriction of fuel rod vibration; ease of fuel bundle assembly; minimization of contact areas between spacer and fuel rods; maintenance of structural integrity of the spacer under normal and abnormal (such as seismic) loads; minimization of reactor coolant flow distortion and restriction; maximization of thermal limits; minimization of parasitic neutron absorption; and minimization of manufacturing costs including adaptation to automated production.

Commonly assigned Matzner et al. U.S. Pat. No. 4,518,679 discloses and claims a nuclear fuel rod bundle spacer uniquely constructed to address these design concerns. As disclosed therein, a spacer is formed of an array of conjoined tubular ferrules surrounded by a peripheral support band, each ferrule bore thus providing a passage or cell through which a fuel rod or other elongated element of the fuel bundle is inserted. The ferrules are spot welded together and to the peripheral support band to provide an assembly of high structural strength, wherein the thickness of the metal used to form the peripheral support band and ferrules can be minimized to reduce coolant flow resistance and parasitic neutron absorption. Neutron absorption is further decreased by forming the ferrules and peripheral support band of low neutron absorption cross section material.

The rods or elements extending through the ferrules are centered and laterally supported therein between rigid projections and resilient members. The rigid projections or stops are formed as fluted or dimpled portions of the ferrule wall at locations near the upper and lower ferrule edges to maximize the axial distance therebetween and thus enhance fuel rod support. The stops are angularly oriented to minimize projected area and thus disturbance of coolant flow.

The resilient members take the form of slender continuous loop springs of generally elliptical shape held captive by oppositely directed tabs formed by C-shaped cutouts in the walls of a pair of adjacent ferrules, whereby the two sides of each spring member project into the bores of its ferrule pair. Thus, a single spring serves two ferrules in biasing the fuel rods into contact with the two axially spaced pairs of stops pursuant to centering them in the ferrule bores.

A typical large nuclear reactor core may include on the order of 800 fuel rod bundles, each with as many as seven spacers, and each spacer may comprise sixty fuel rod-positioning ferrules. From this, it is seen that automated, expedited production of a rather involved assembly of many piece parts to manufacture a nuclear fuel rod spacer of such construction is of vital necessity.

It is accordingly an object of the present invention to provide apparatus for assembling nuclear fuel rod bundle spacers on an expedited, automated bundle basis.

A further object is to provide automated apparatus of the above-character for handling, orienting and manipulating the individual fuel rod-positioning ferrules and springs pursuant to producing a ferrule pair-captive spring subassembly.

An additional object is to provide automated apparatus of the above character for positioning successive ferrule pair-captive spring subassemblies in spacer assembly formation.

Another object is to provide automated assembly apparatus of the above-character which is economical in construction, efficient in operation, and reliable over a long service life.

Other objects of the invention will in part be obvious and in part appear hereinafter.

SUMMARY OF THE INVENTION

In accordance with the present invention, there is provided automated apparatus for assembling nuclear fuel bundle spacers, which includes a first station for loading successive pairs of nuclear fuel rod-positioning ferrules, a second station for loading rod-positioning springs, a third station for capturing a spring in subassembled relation with a ferrule pair, and a forth station for assembling the resulting ferrule pair-captive spring subassembly into a spacer assembly fixture; these stations being angularly spaced about a rotatably mounted indexing table. A plurality of identical ferrule fixtures are carried by this table for concurrent presentation of each station. The ferrule loading station automatically loads a pair of precisely oriented ferrules onto the fixture thereat, and the table indexes this fixture to the spring loading station where a spring is automatically placed in preassembled relation with the ferrule pair.

When indexed to the next, spring capturing station, the ferrules of the fixture-mounted pair are automatically manipulated to capture the spring in subassembled relation with the ferrule pair. The resulting ferrule pair-captive spring subassembly is indexed on its fixture by the table to the spacer assembly station where it is picked from the ferrule fixture and placed at a predetermined location in the spacer fixture. The empty ferrule fixture is then indexed by the table back to the ferrule loading station for receipt of another ferrule pair. The assembly operation with respect to each ferrule fixture is thus performed in four successive steps by the four stations in time phase relation.

The invention accordingly comprises the features of construction, combination of elements, and arrangement of parts, all as set forth in the following Detailed Description, and the scope of the invention will be indicated in the claims. For a full understanding of the nature and objects of the invention, reference may be had to the following Detailed Description taken in conjunction with the accompanying drawings, in which:

Corresponding reference numerals refer to like parts throughout the several views of the drawings.

DETAILED DESCRIPTION

Figure 1:
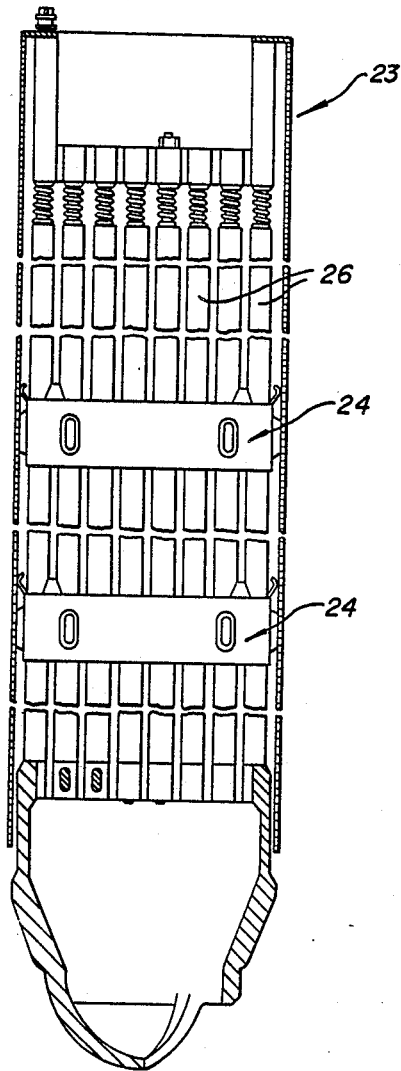
FIG. 1 is a elevational view, partially broken away, of a nuclear fuel bundle.
Figure 1A:
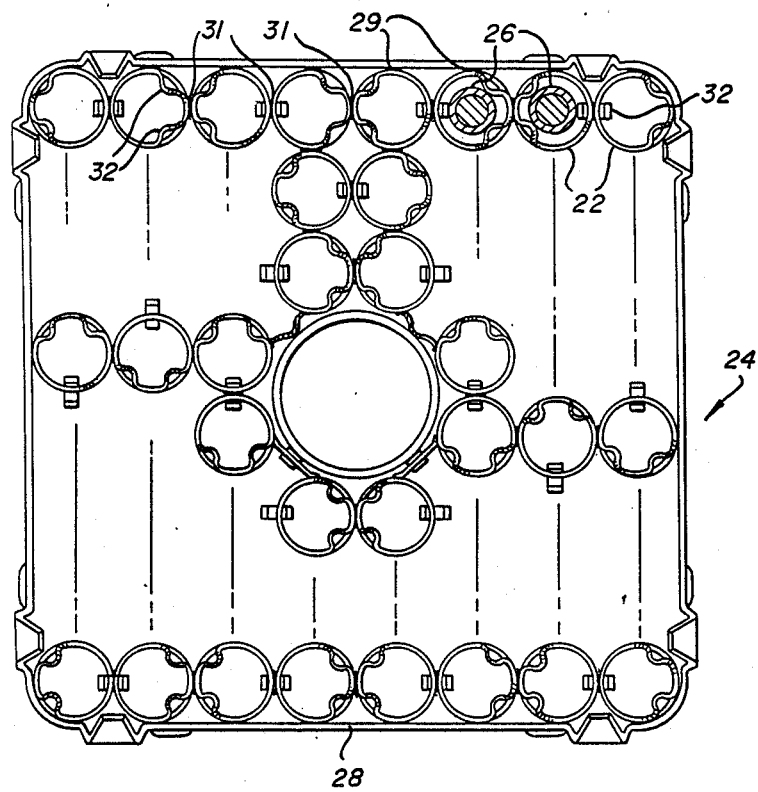
FIG. 1A is a plan view of one of the spacers utilized in the fuel bundle of FIG. 1.
Figure 1B:
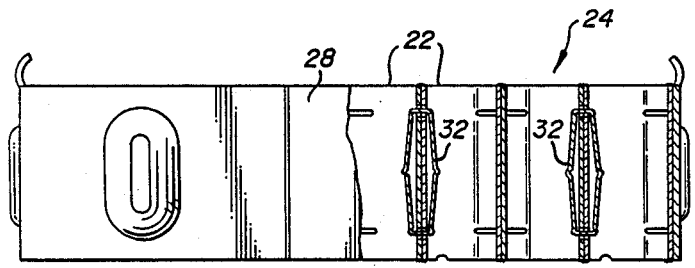
FIG. 1B is a side view, partially broken away, of the nuclear fuel bundle spacer of FIG. 1A.
Figure 3:
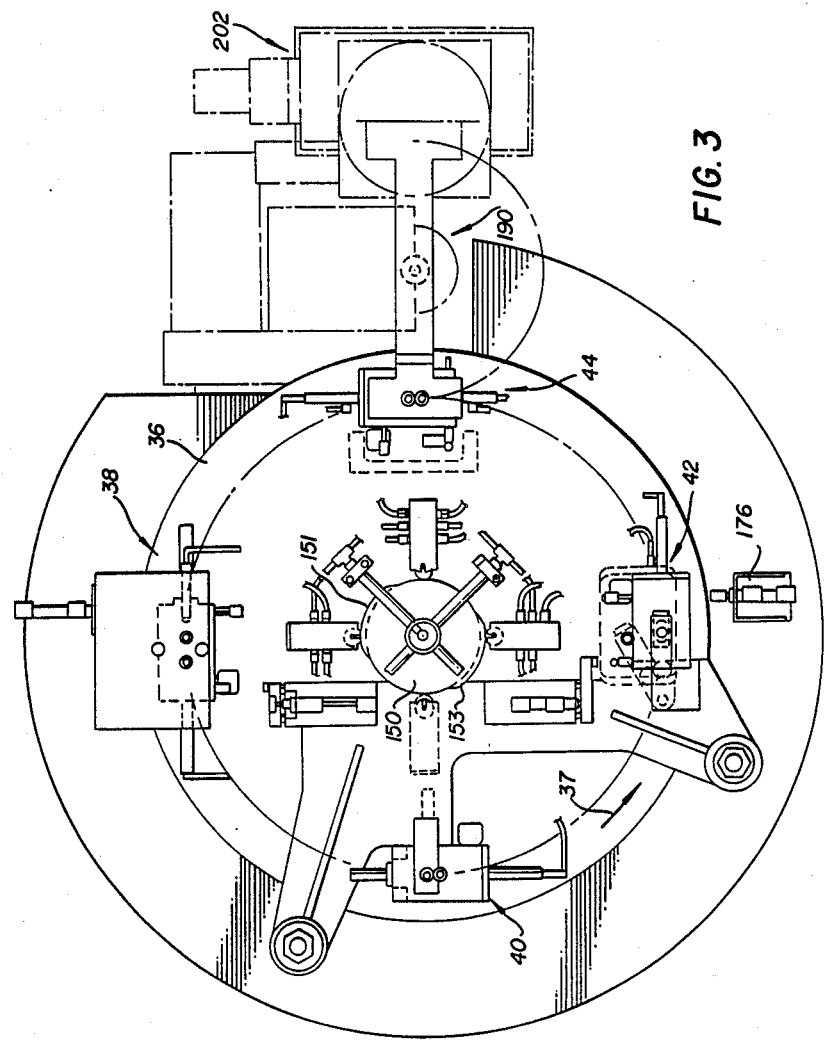
FIG. 3 is a plan view of automated apparatus for assembling the spacer of FIGS. 1A and 1B.
Figure 4:
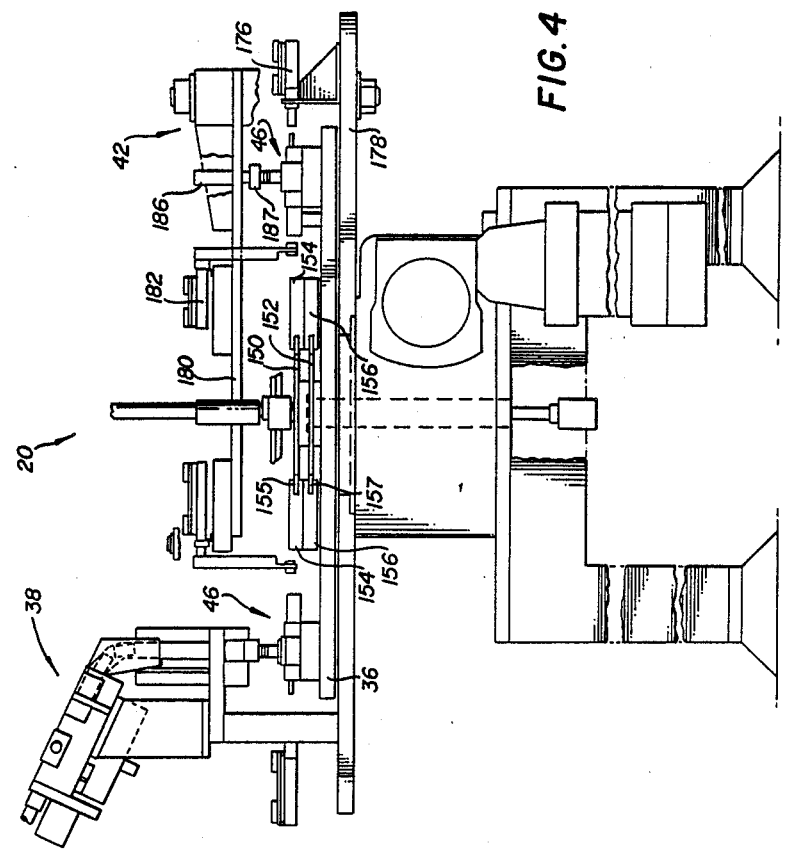
FIG. 4 is a side view of the automated assembly apparatus of FIG. 3.

The automated assembly apparatus of the present invention, generally indicated at 20 in FIGS. 3 and 4, is disclosed in its embodiment devoted to assembling a multiplicity of fuel rod-positioning ferrules 22 into a matrix array to create a spacer, generally indicated at 24 in FIGS. 1, 1A and 1B. These spacers are utilized to precisely maintain the relative positions of a plurality of nuclear fuel rods in a fuel bundle, as disclosed in the commonly assigned Matzner U.S. Pat. No. 4,508,679 and as generally indicated at 23 in FIG. 1 herein. Thus, each ferrule bore provides a passage or cell through which an individual fuel rod 26 is inserted. The ferrule array is surrounded by a perimetrical band 28, to which the ferrules in the outermost rows and columns are conjoined at contiguous upper and lower edge points by suitable means, such as spot welds indicated at 29. Contiguous edges of adjacent ferrules are also conjoined by spot welds, indicated at 31, to create a rigid spacer assembly. Suitable laser welding apparatus for this purpose is disclosed and claimed in commonly assigned Muncy et al. copending application Ser. No. 07/279010, entitled "System for Automated Welding of Parts Assembly in Controlled Environment".

To position each fuel rod within a ferrule bore, the sidewall of each ferrule 22 is formed at each end with a pair of angularly spaced, inwardly projecting dimples or stops 30 of a precision stop height. Suitable stop forming apparatus is disclosed and claimed in commonly assigned King et al. copending application Ser. No. 07/279009, entitled "Automated Forming Apparatus". Assembled with each different pair of ferrules is a double-acting, continuous loop spring 32 which serves to bias the fuel rods against the stops of the associated ferrule pair. Thus, the fuel rods are precisely centered within each ferrule bore. Automated apparatus for checking the stop height dimensions is disclosed in commonly assigned Reeves et al. copending application Ser. No. 07/279008, entitled "Automated Gauging Apparatus".

Figure 2:
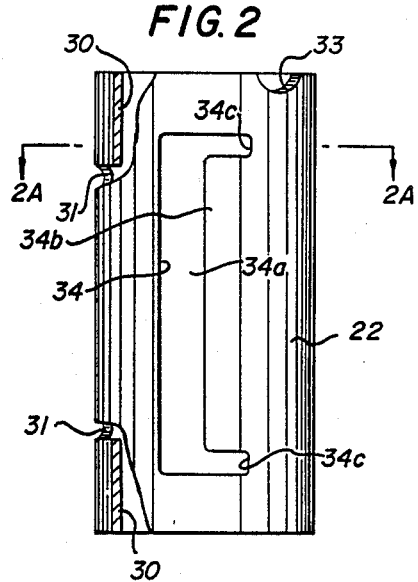
FIG. 2 is an elevational view of a nuclear fuel rod-positioning ferrule utilized in the spacer of FIGS. 1A and 1B.
Figure 2A:
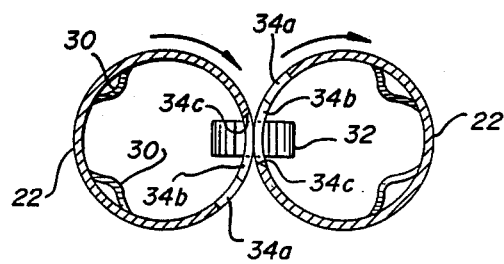
FIG. 2A is a horizontal sectional view of a ferrule pair-spring subassembly included in the spacer of FIGS 1A and 1B.

To assemble spring 32 to each ferrule pair, a C-shaped cutout 34 is cut into the sidewall of each ferrule, as seen in FIG. 2, to provide a longitudinally elongated opening 34a and a circumferentially projecting tab 34b flanked by circumferentially extending notches 34c. In addition, circumferential slits 31 are cut into the ferrule sidewall to facilitate the formation of stops 30, and a notch 33 is cut into one edge of the ferrule to reference the relative angular positions of the slits and cutout. Automated apparatus for creating these feature cuts in the ferrule sidewall is disclosed and claimed in commonly assigned Muncy et al. copending application Ser. No. 07/279007, entitled "Apparatus for Machining Intricate Feature Cuts in Thin Walled Tubular Parts". Initially, two ferrules are juxtaposed in paired side-by-side relation with their cutout opening 34a in aligned, confronting relation. A spring 32 is centered in the aligned openings, and the ferrules are then rotated in opposite directions, as illustrated in FIG. 2A. Tabs 34b are thus swung in opposite directions to enter the open interior of spring 32, which then becomes captivated in the cooperating notches 34c of the ferrule pair, all as described in the above-cited Pat. No. 4,508,679.

The automated assembly apparatus 20, seen in FIGS. 3 and 4, operates to successively assemble ferrules 22 into a properly oriented pair of ferrules, assemble a spring 32 to each pair, and then assemble the subassembled ferrule pair with captive spring into the matrix or "egg crate" formation seen in FIG. 1A, all on an automated production line basis. As seen in the plan view of FIG. 3, the automated assembly apparatus includes a rotating table 36 which is indexed from a ferrule loading station, generally indicated at 38, a spring loading station, generally indicated at 40, a spring capturing station, generally indicated at 42, and a spacer assembly station, generally indicated at 44. This table carries four identical ferrule fixtures. generally indicated at 46, which are angularly spaced 90° apart and thus are concurrently presented at each station. Consequently, the assembly of each ferrule pair and spring subassembly into a spacer 24 is accomplished in four steps of table 36. As each subassembly is assembled into a spacer at station 44, successive ferrule pairs are undergoing various stages of assembly at stations 42, 40 and 38.

Figure 5:
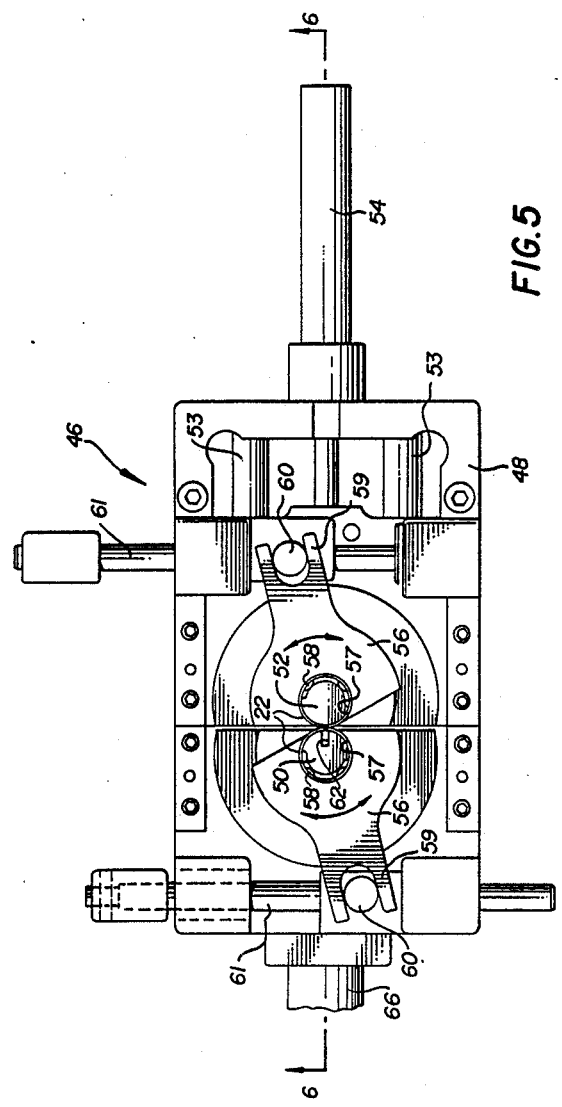
FIG. 5 is a plan view of one of the identical ferrule fixtures utilized in the apparatus of FIGS. 3 and 4.
Figure 6:
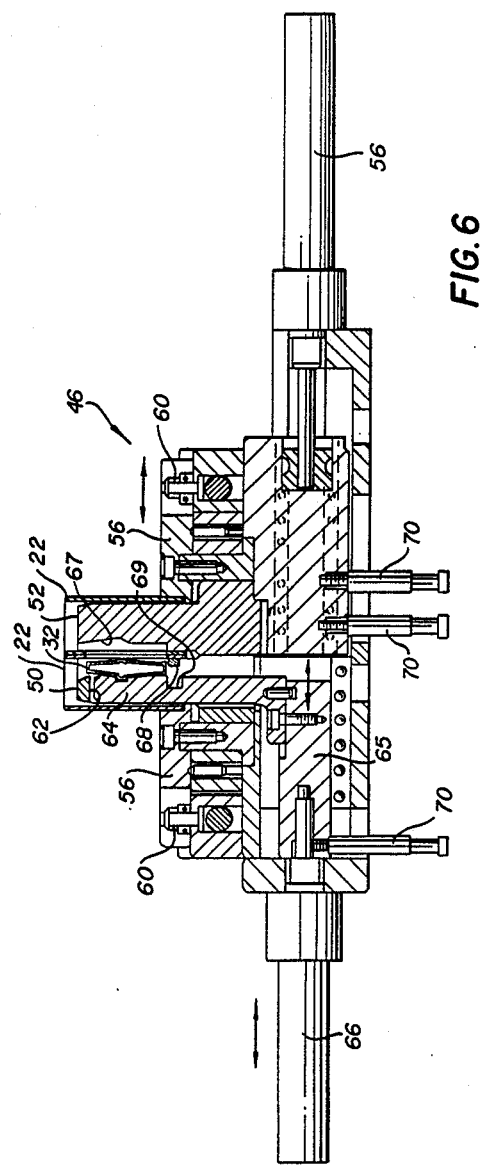
FIG. 6 is a sectional view taken along line 6—6 of FIG. 5.

Referring jointly to FIGS. 5 and 6, each of the four ferrule pair fixtures 46 includes a fixture block 48 for mounting a pair of posts 50 and 52; the later mounted on a pair of guide rods 53 for linear movement between a position juxtaposed post 50, as illustrated, and a position spaced therefrom under the motivation of an air cylinder 54. As will be seen in FIG. 9, a ferrule 22 is inserted on each post while post 52 is in its spaced position relative to post 50. A pair of manipulator arms 56 are rotatably mounted by fixture block 48, each having an arcuate recess 57 partially surrounding a different one of the posts 50, 52 in closely spaced relation. Nubs 58, protruding from the surfaces of these arcuate recessses, are received in the indentation created in the ferrule peripheral surface by the formation of lower stops 30, such that the arms can drivingly engage the ferrules. The arms are provided with yokes 59 which engage pins 60 carried by rods 61 slidingly mounted by fixture block 48. Thus, reciprocation of these rods 61 is seen to be effective to rotate the ferrules on their respective posts and thus captivate spring 32 at station 42 and to reposition arms 56 at station 38 such as to accept a pair of ferrules oriented with their C-shaped cutout openings 34a aligned in confronting relation.

Still referring to FIGS. 5 and 6, fixed post 50 is, as best seen in the latter figure, provided with a vertically elongated cavity 62 for accommodating an upstanding blade 64 carried on a slide 65 mounted by fixture block 48. This slide is reciprocated by an air cylinder 66 to move the blade between its illustrated retracted position and a spring centering, closed position. Post 52 is formed with a shallow, vertically elongated notch 67. The confronting surfaces of blade 64 and notch 67 are conformed to the profile of spring 32. With the blade in its retracted position, cavity 62 is opened to receive a spring at station 40, which rests on a stop 68 projecting from post 52 into the cavity. When blade 64 is shifted to its closed position by air cylinder 66, spring 32 is centered in the confronting cutout openings 34a preparatory to capture when the ferrules are rotated by arms 56. It is seen that blade 64 is notched at 69 to receive spring stop 68 when blade 64 shifts to its spring centering position. Sensors 70 strategically position in fixture monitor the various operations of fixture 46.

Figure 7:
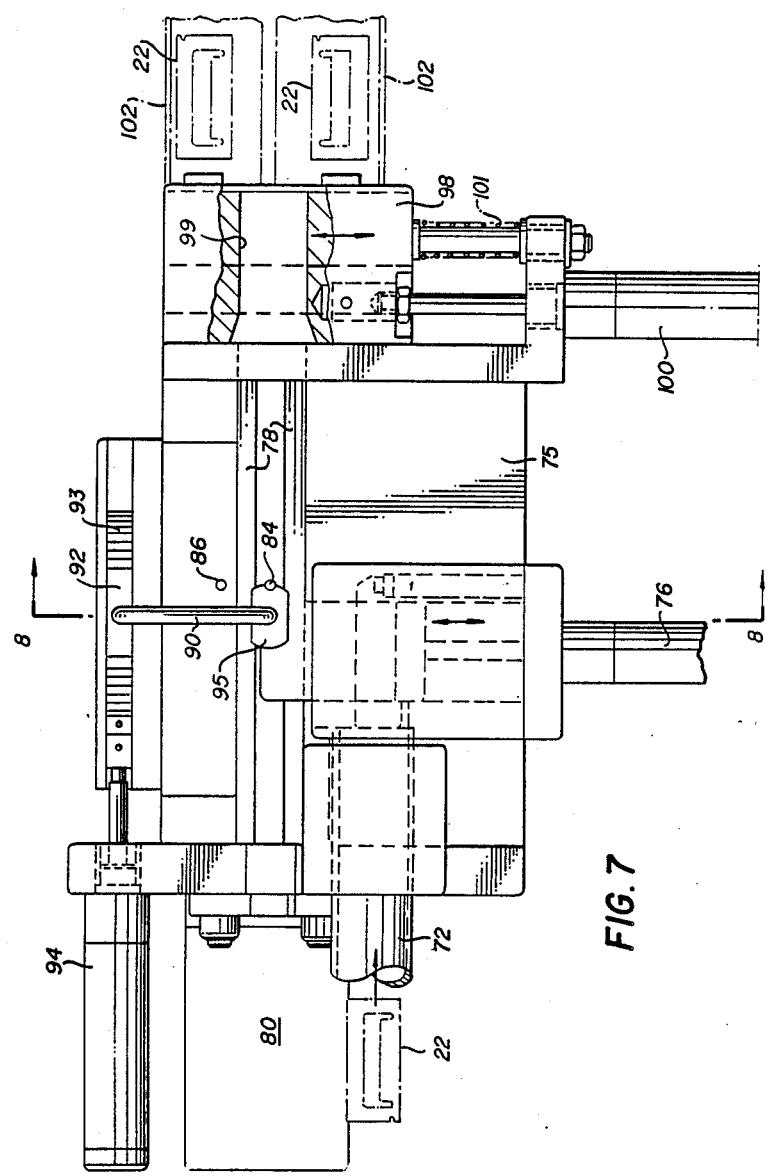
FIG. 7 is a plan view of a portion of the ferrule loading station included in the apparatus of FIGS. 3 and 4.
Figure 8:
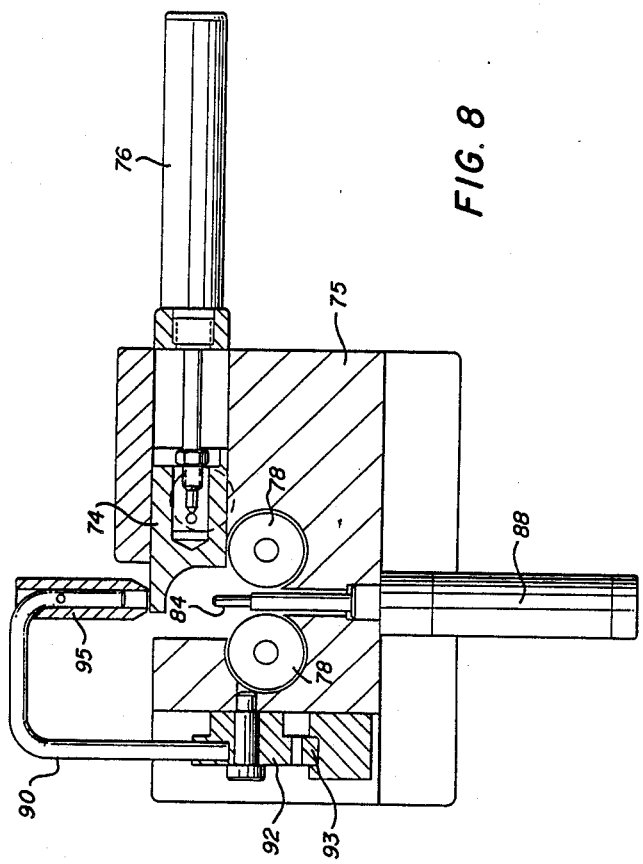
FIG. 8 is a sectional view taken along line 8—8 of FIG. 7.

Considering the details of ferrule loading station 38, ferrules 22 are fed successively from a suitable parts feeder, such as a vibratory bowl feeder (not shown), through an inclined delivery tube 72 to a shuttle 74 slideably mounted by a support structure 75, as seen in FIGS. 7 and 8. This shuttle is actuated by an air cylinder 76 to laterally shift each ferrule 22 exiting the delivery tube onto a pair of elongated rollers 78 mounted in inclinded, closely spaced parallel relation. These rollers are driven in counter-rotation by a motor 80 to impart unindirectional rotation to a ferrule supported thereon.

As previously noted in connection with FIG. 2, the edge of one end of each ferrule is keyed with a semicircular reference notch 33 which serves as an angular reference point utilized in the forming process to precisely locate stops 30 relative to C-shaped slot 34. Thus, rollers 78 in FIGS. 7 and 8 serve to rotate a ferrule as it gravitates toward a pin 84 upstanding between the rollers. As seen in FIG. 7, of the leading edge of the ferrule contains this notch, pin 84 quickly finds and becomes lodged therein. A sensor 86 looks for the ferrule leading edge to detect if the notch has been found by pin 84. If it has, the pin is retracted by an air cylinder 88, and the ferrule gravitates therebeyond, as supported by the counter-rotating rollers.

On the other hand, if the pin does not find the notch, meaning that the notch is in the ferrule trailing edge, the ferrule most be inverted. To effect this longitudinal reorientation, an inverter mechanism is provided to include a U-shaped arm 90 mounted at one end to a sector gear 92 journalled by support structure 75. This gear meshes with a rack gear 93 slideably mounted by the support structure for reciprocation by an air cylinder 94. The free end of the arm carries a thimble 95 which is normally poised above and in alignment with the axis of a ferrule supported in the rollers. If reorientation of a ferrule is called for by the sensor 86, air cylinder 94 is activated to stroke rack gear such as to swing arm 90 in the downhill direction as pin 84 is retracted. Thimble 95 is thus positioned to slip into the ferrule through its unnotched leading end as it gravitates along on rollers 78. Air cylinder 94 then strokes rack gear 93 in the opposite direction to swing the arm around to the point where the ferrule is dropped back into the rollers inverted end for end. The ferrule is thus reoriented with notch 33 in its leading edge. Pin 84 remains retracted to allow the ferrule to gravitate therepast on the rollers.

Stationed downstream from the retractable pin 84, as seen in FIG. 7, is a pairing shuttle 98 slidingly mounted by support structure 75 for transverse reciprocation by an air cylinder 100. A compression spring 101 biases this shuttle to quiescent position with its ferrule-receiving cavity 99 poised to accept each ferrule delivered thereto by rollers 78. Shuttle is stroked back and forth through its quiescent position by air cylinder 100 to deposit successive accepted ferrules alternately into a pair of side-by-side delivery chutes 102. Ferrule detecting sensors (not shown) coordinate the operations of shuttles 74 and 98 such that, as each ferrule is accepted by the latter, the former transfers the next ferrule in delivery tube 72 to the rollers 78.

Figure 9:
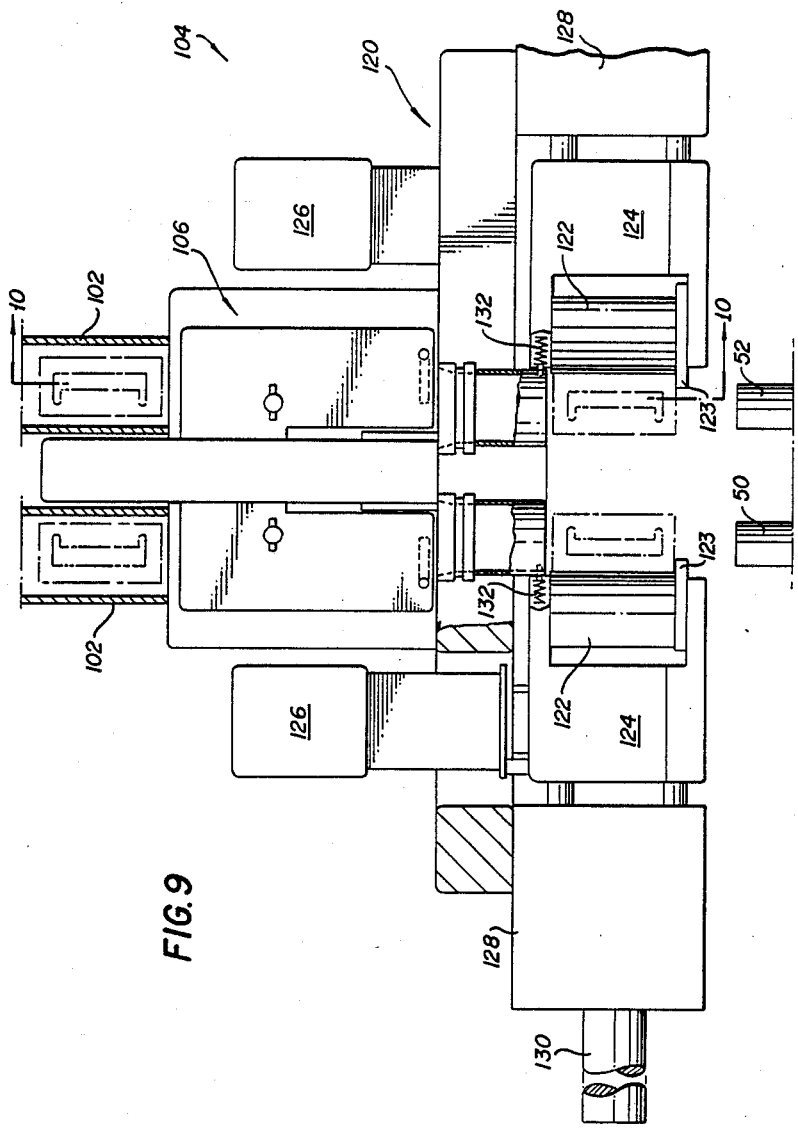
FIG. 9 is an elevational view of a further portion of the ferrule loading station included in the apparatus of FIGS. 3 and 4.
Figure 10:
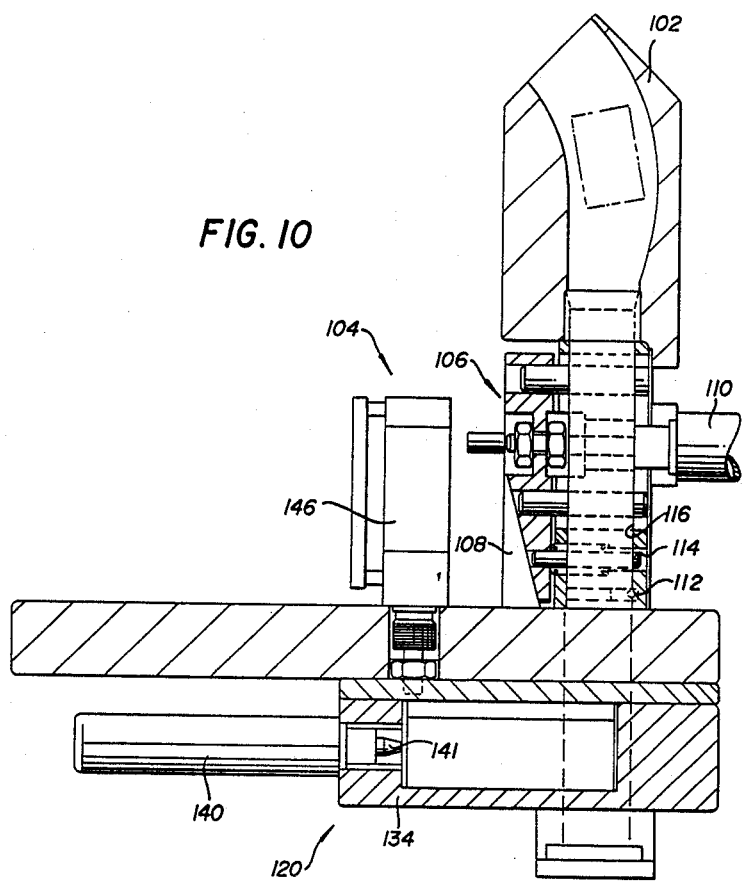
FIG. 10 is a sectional view taken along 10—10 of FIG. 9.
Figure 11:
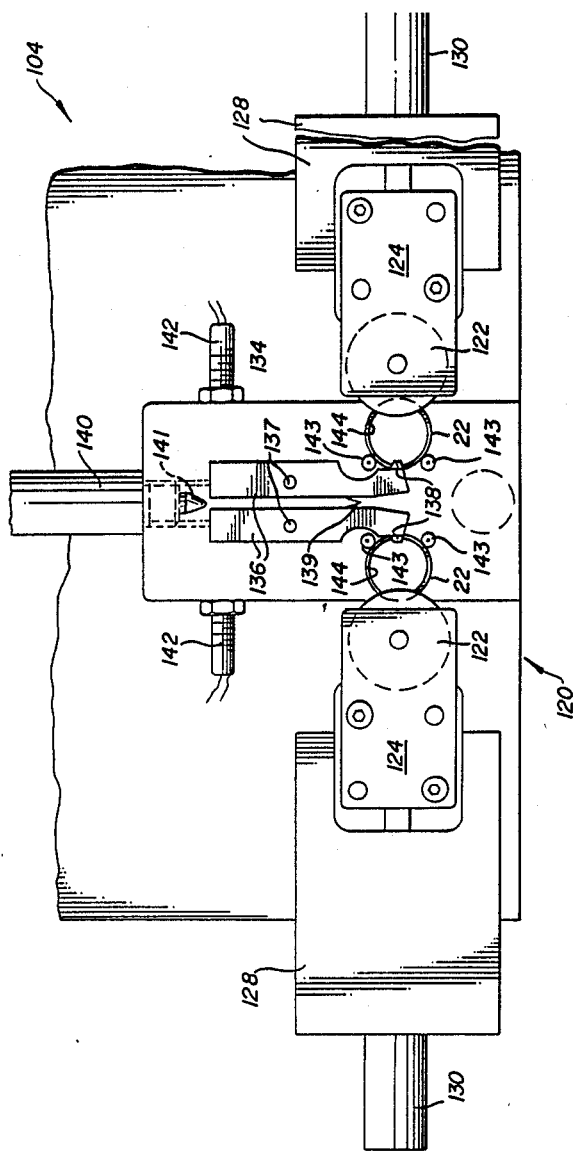
FIG. 11 is a bottom view of the portion of the ferrule loading station seen in FIG. 9.

The ferrules in chutes 102 are routed downwardly to a loading head, generally indicated at 104 in FIGS. 9, 10 and 11, where they are queued up by an escapement mechanism, generally indicated at 106. This mechanism includes, as seen in FIG. 10, a plate 108 which is reciprocated by an air cylinder 110 to variously position a pair of ferrule stops 112 and 114 in each of a pair of side-by-side coextensive channels 116 in communication with the lower, exit ends of chutes 120. These escappenents stops operate to release the ferrules, a pair at a time, to a orienting and loading mechanism, generally indicated at 120.

As seen in FIGS. 9 and 11, this mechanism includes a pair of opposed rollers 122 which are rotatably mounted by separate yokes 124 and driven by separate motors 126. These yokes are slidingly mounted by guide blocks 128 for reciprocation by separate air cylinders 130. The lower ends of rollers 122 are provided with flanges 123 which serve as positioning stops for a ferrule pair released by escapement mechanism 106. Positioning springs 132 (FIG. 9), carried by yokes 124, act against a mounting block 134 to ensure that the roller peripheries are clear of the ferrules as they drop down into abutment with the roller flanges 123. Mounting block 134, as best seen in FIG. 11, also supports a pair of arms 136 pivotally mounted intermediate their ends at 137. The illustrated lower ends of these arms carry locating wedges 138 which are baised by a compression spring 139 acting in opposite directions agianst the arms at locations below their pivot points. The ferrules, supported on edge by the roller flangs 123, are thus urged against the roller peripheral surfaces by locating wedges 138. An air cylinder 140 is activated to drive its conically tipped plunger 141 between the illustrated upper ends of the arms to swing locating wedges 138 toward each other so as not to interfere with the descent of a pair of ferrules into abutment with their roller flange stops. Upon arrival of the ferrule pair thereat, plunger 141 is retracted, and locating wedges 138 urge the ferrules into driving engagement with rollers 122. The roller motors 126 are activated, and the ferrules are rotated on their axes with locating wedges 138 riding on the ferrule peripheral surfaces. The axial positions of the rotated ferrules are maintained by bearing rollers 143. The dimensions of these locating wedges are such that they can lodge in the longitudinal openings 34a of the ferrule C-shaped cutouts 34. As each locating wedge finds this opening the resulting incremental arm motion, induced by spring 139, is sensed by a sensor 142 which issues a signal to deactivate the associated roller motor 126. It is seen from FIG. 11 that when ferrule rotation is arrested by the locating wedges 138, the ferrules of the pair are angularly oriented with their cutout openings 34a in opposed, aligned relation. Air cylinder 130 are then signalled to retract the rollers 122 and clear the roller flanged from the lower flange edges. The ferrules then become resiliently clamped against arcuate surfaces 144 of mounting block 134 by compression spring 139 acting via arms 136 and their locating wedges 138 to preserve the achieved, requisitie ferrule angular orientation. At this point, an air cylinder 146 is activated to drive mounting block 134 downwardly to seat the ferrules on posts 50 and 52 of the ferrule fixtures 46 (FIG. 5) which has been indexed to ferrule loading station 38 by table 36.

Returning to FIGS. 3 and 4, a pair of stationary cams 150 and 152 are centrally mounted one over the other, relative to table 36, while a pair of air valves 154 and 156 are mounted to the table radially inwardly from each ferrule fixture 46. These valves are equipped with cam following actuators 155 and 157 which ride along on cams 150 and 152, respectively. From FIG. 3, it is seen that cam 150 is formed with a lobe 151 which, when encountered by an actuator 155 positions its valve 154 to activate the air cylinder 54 of a ferrule pair fixture 46, causing ferrule post 52 to be retracted from its juxtaposed position with ferrule post 50 seen in FIG. 5. This lobe is seen in FIG. 3 to extend from a fixture position just beyond spacer assembly station 44 in the counterclockwise direction of table rotation (arrow 37) to a fixture position just beyond ferrule loading station 38. Thus, as each fixture 46 leaves station 44, the ferrule post 52 is retracted from ferrule post 50, such that these posts assume the requisite spaced apart relationship seen in FIG. 9 aligned with the two ferrules held by loading block 134 as it descends to insert the angularly oriented ferrules on these posts. When the table is next indexed a quarter turn, as a fixture 46 departs ferrule loading station 38, its valve actuator 155 rolls off the trailing edge of lobe 151. Fixture air cylinder 54 is then activated to translate post 52 into juxtaposition with post 50 to bring the cutout openings 34a of the ferrules thereon into intimate, face-to-face relation ready for the insertion of spring 32 upon arrival at station 40.

The lobe 153 on cam 152 controls the actuation of blade positioning air cylinder 66 of each ferrule fixture 46 (FIG. 5). Again as seen in FIG. 3, this lobe extends counterclockwise from a fixture position just beyond spring loading station 40 to a fixture position just beyond spring capturing station 42. Until valve actuators 157 encounter lobe 153, their valves 153 activates the air cylinders of the associated ferrule fixtures 46 such as to position blades 64 to retracted positions seen in FIG. 6. After insertion of a spring 32 into the opened cavity 62 in post 50 of a fixture 46 at station 40, lobe 153 is encountered by an valve actuator 157 as the fixture departs the station with next table step. The valve 156 associated with this fixture then actuates the fixture's air cylinder 66. Blade 64 is thus shifted toward post 52 to center the spring 32 within the facing ferrule cutout openings 34a. When a fixture departs spring captivation station 42, valve actuator 157 rolls of the tailing end of lobe 153, and the blade 64 of this fixture is retracted. It will be appreciated that this blade retraction does not disturb the spring, since it has been interlocked in the closed notches 34c (FIG. 2) of the ferrule pair.

Figure 12:
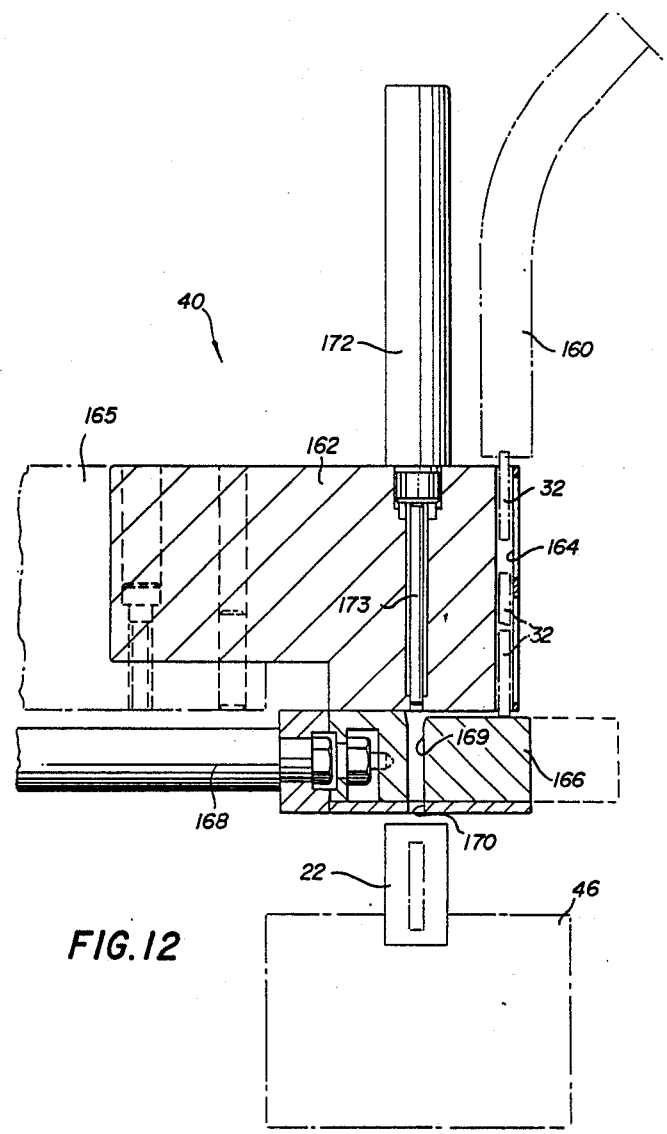
FIG. 12 is an elevational view, partially in section, of the spring loading station utilized in the apparatus of FIGS. 3 and 4.

Spring loading station 40, as seen in FIG. 12, includes an inclined delivery track 160 extending from a suitable serial parts feeder, such as a vibratory bowl feeder (not shown), for delivering a succession of springs 32 to a loading head 162. The springs are queued up in a channel 164 formed in the loading head which is mounted by a support member 165 immediately above a ferrule fixture 46 in its spring loading station indexed position. The leading spring of this queue is stopped by a shuttle 166 in its illustrated leftmost position. This shuttle, reciprocatingly mounted by the loading head, it stroked rightward by an air cylinder 168 to pick up the leading spring in a vertical shuttle cavity 169 and is then stroked leftward to align this cavity with an opening 170 in loading head 162. An air cylinder 172 is then activated to extend its plunger 173 and drive the spring downwardly out of shuttle cavity 169 through opening 170 into the cavity 62 left open by the retracted blade 64 of fixture post 50 (FIG. 6). The air cylinder plunger 173 is retracted, and shuttle 166 picks up the next spring in the queue upon arrival of the next ferrule fixture at spring loading station 40.

As described above, the loaded spring is centered in the aligned ferrule openings 34a by the shifting of blade 64 toward post 52 upon arrival of a fixture 46 at spring capturing station 42. As seen in FIGS. 3 and 4, an air cylinder 176 is mounted at station 42 on a stationary platform 178 underlying and extending beyond the perimeter of rotating table 36. A deck 180, mounted to this platform in elevated relation to table 36, carries a second air cylinder 182 also included at spring capturing station 42. Referring jointly to FIGS. 3-5, the plunger 177 of air cylinder 176 and the depending extension 183 of the plunger for air cylinder 182 are positioned, upon actuation, to engage corresponding opposite ends of rods 61 (FIG. 5). The rods are thus concurrently stroked to swing arms 56 and hence rotate the ferrules on posts 50, 52 in opposite directions. The ferrules tabs 34b (FIG. 2) thus are projected through the spring 32 in opposite directions to capture the spring in the now closed notches 34c. Preferably, station 42 also includes an additional air cylinder 186 mounted by deck 180. The vertically oriented plunger of this air cylinder carries a hold-down pad 187 which is extended into lightly bearing engagement with the upper edges of the ferrules to prevent axial shifting thereof during spring capturing ferrule rotation induced by air cylinders 176 and 182.

Figure 13:
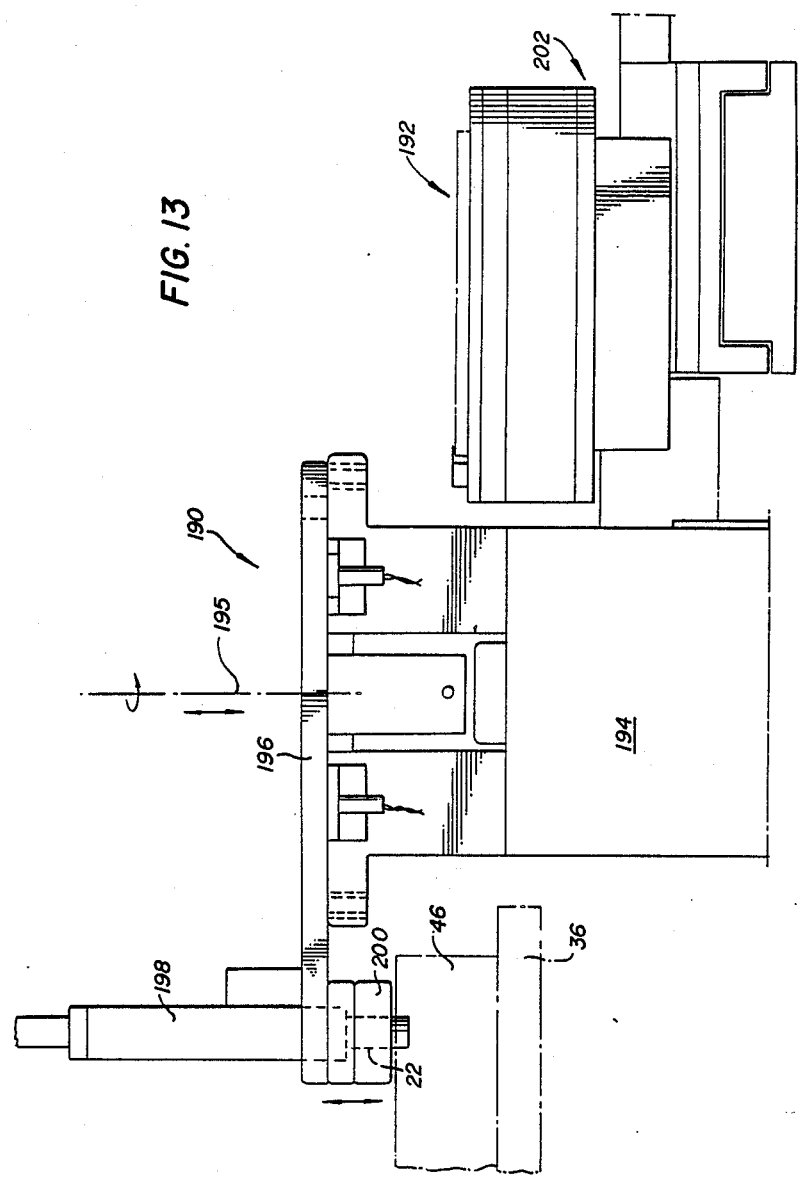
FIG. 13 is a plan view of the spacer assembly station utilized in the apparatus of FIGS. 3 and 4.
Figure 14:
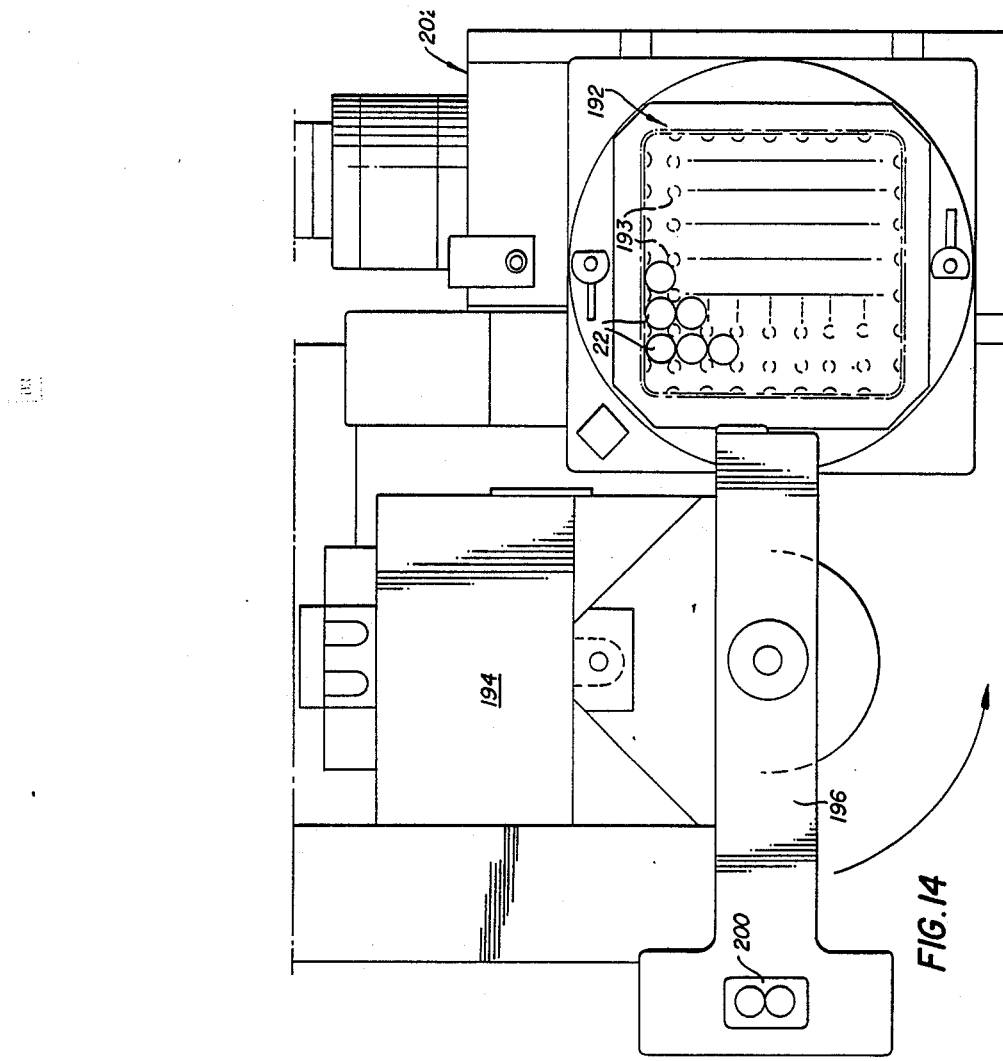
FIG. 14 is a plan view of the spacer assembly station of FIG. 13.

The fixture 46 carrying the ferrule pair with captive spring is then indexed by table 36 to spacer assembly station 44. This table step is accompanied by retraction of spring centering blade 64, as described above. As seen in FIGS. 13 and 14, the spacer assembly station includes a pick and place mechanism, generally indicated at 190, operating to pick the ferrule pair-spring subassembly from a fixture 46 presented thereto and place it in a spacer fixture, generally indicated at 192.

The pick and place mechanism includes a transport base 194 operating to both vertically reciprocate along and horizontally rotate an arm 196 about an axis 195. Mounted at one end of this arm is an air cylinder 198 acting to vertically reciprocate gripper fingers 200 fashioned to pick a ferrule pair subassembly from a fixture 46. Thus, in operation, transport base 194 lifts arm 196 and rotates it to a position where gripper fingers 200 are vertically aligned with a fixture-borne ferrule pair subassembly presented at spacer assembly station 44. Air cylinder 198 is activated to reciprocate the gripper fingers and pick the subassembly from the fixture. Arm 196 is then rotated about axis 195 to swing the gripped subassembly around to a position above spacer fixture 192. Air cylinder 198 is again activated to place the ferrule pair assembly in the spacer fixture.

It will be appreciated that, to achieve the "egg crate" spacer assembly configuration seen in FIG. 1A, the placement of each ferrule pair must be effected at a different location in spacer fixture 192. To this end, the spacer fixture is clamped to a precision, three-axis positioning table, generally indicated at 202. This table is programmed to linearly position the spacer fixture along orthogonal X and X axes, and to rotate it about a vertical Z axis. Thus, after each ferrule pair is placed in the spacer fixture, table 202 repositions the spacer fixture so that the next ferrule pair placement is made at an adjacent, vacant fixture location. As seen in FIG. 14, spacer fixture 192 is provided an array of upstanding posts 193 located to guide the placements of successive ferrule pair subassemblies into precise positions throughout the fixture.

Returning to FIGS. 3 and 4, as a ferrule fixture 46 is indexed from spacer assembly station 44 back to ferrule loading station 38, fixture post 52 separation from fixture post 50 is initiated by cam 150, as previously described. Upon arrival at station 38, an air cylinder 210, mounted on platform 178, and an air cylinder 212, mounted by deck 180, act on fixture rods 61 (FIG. 5) to swing arms 56 back to their positions for accepting ferrules loaded onto the separated posts 50, 52 with the cutout openings 34a in confronting relation.

It is seen from the foregoing that the objects set forth above, including those made apparent from the preceding description, are efficiently attained, and, since certain changes may be made in the disclosed construction without departing from the scope of the invention, it is intended that all matters of detail contained herein be taken as illustrative and not in a limiting sense.

Having described the invention, what is claimed as new and desired to secure by Letter Patent is:

1. Automated apparatus for assembling nuclear fuel bundle spacers, said apparatus comprising, in combination:
   A. an indexing table;
   B. a plurality of identical ferrule fixtures affixed to said table in angularly spaced relation, each said ferrule fixture equipped to accept a pair of ferrules;
   C. a ferrule loading station to which said ferrule fixtures are successively indexed by said table, said loading station operating to load a pair of ferrules onto the one of said ferrule fixtures thereat in a predetermined oriented relation;
   D. a spring loading station to which said ferrule fixtures are successively indexed from said ferrule loading station by said table, said spring loading station operating to load a spring onto the one of said ferrule fixtures thereat in pre-assembled relation with the fixture mounted pair of ferrules;
   E. a spring capturing station to which said ferrule fixtures are successively indexed from said spring loading station by said table, said spring capturing station operating to manipulate the ferrule pair and spring such as to produce a subassembly consisting of a pair of ferrules and a spring interlocked therewith in captive relation; and
   F. a spacer loading station to which said ferrule fixtures are successively indexed from said spring capturing station by said table, said spacer loading station operating to transfer said subassembly from the one of said ferrule fixtures thereat to a predetermined position in a spacer assembly fixture, said ferrule fixtures being successively indexed from said spacer loading station arount to said ferrule loading station by said table, the operations of said stations being performed substantially concurrently with regard to the one of said ferrule fixtures thereat.

2. The automated asembly apparatus defined in claim 1, wherein each said ferrule fixture includes a pair of upstanding posts respective mounting a pair of ferrules as loaded by said ferrule loading station.

3. The automated assembly apparatus defined in claim 2, wherein each said ferrule fixture further includes a separate rotatably mounted manipulator engageable with the ferrule mounted on each said post, said spring capturing station including means for rotating said manipulators to impart incremental rotations of the ferrules on said posts pursuant to producing said subassembly.

4. The automated assembly apparatus defined in claim 3, wherein one post of each said ferrule fixture is provided with a cavity adapted to receive a spring which deposited by said spring loading station, each said ferrule fixture further including a positioning element operating in said cavity to shift the spring into an assembling position relative to the fixture mounted ferrule pair prior to the incremental rotations of the ferrules by said manipulators.

5. The automated assembly apparatus defined in claim 4, adapted for use with ferrules having a sidewall containing an identical C-shaped cutout having a longitudinally elongated central opening and a circumferentially extending tab flanked by circumferentially extending notches, and for use with a spring being in the form of a double-acting loop spring, said ferrule loading station including means for angularly orienting each pair of ferrules loaded on said ferrule fixture posts with their central openings in confronting relation and aligned with said cavity in said one post, said positioning element shifting the spring to said assembling position substantially centered in the central openings of the ferrule pair, whereby incremental rotation of the ferrules by said manipulators in opposite directions swings the tabs in opposite directions into the spring open interior to interlock the spring in the notches of the ferrule pair and thereby produce said subassembly.

6. The automated assembly apparatus defined in claim 5, wherein one of said posts of each said ferrule fixture is mounted for movement between spaced and juxtaposed positions with respect to the other of said posts, and means for shifting said one post to said spaced position preparatory to the loading of a ferrule pair on said ferrule fixture by said loading station and shifting said one post to said juxtaposed position preparatory to the depositing of a spring into said cavity by said spring loading station.

7. The automated assembly apparatus defined in claim 6, wherein each said ferrule fixture includes a first actuator for positioning said spring positioning element and a second actuator for shifting said one post between said spaced and juxtaposed positions, and means coordinated with the indexing of said table for controlling the operations of said first and second actuators.

8. The automated apparatus defined in claim 7, wherein said spring capturing station includes means movable into bearing engagement with the upper edges of the fixture mounted ferrule pair thereat to sustain the axial positions of the ferrules on said posts during incremental rotations thereof by said manipulators.

9. The automated apparatus defined in claim 7, wherein said ferrule loading station includes means for restoring said manipulators of the one of said ferrule fixtures thereat to respective ferrule loading positions for accepting a ferrule pair loaded on said posts with the central openings thereof in confronting relation.

10. The automated assembly apparatus defined in claim 7, wherein said spacer loading station includes a positioning table supporting said spacer fixture, and a transfer mechanism for picking said subassemblies from said ferrule fixtures successively presented thereat and placing said subassemblies in said assembly fixture at various locations determined by the positioning of said spacer fixture by said positioning table.

11. The automated apparatus defined in claim 5, wherein said ferrule loading station includes first means operating to ensure a predetermined longitudinal orientation of each ferrule, second means for arranging the ferrules in a pair of parallel queues, and third means for successively accepting a pair of ferrules, one from each said queue, and angularly orienting the ferrules of the ferrule pair with their central opening in confronting relation preparator to loading onto the one of said ferrule fixtures thereat.

12. The automated apparatus defined in claim 11, wherein said first means of said ferrule loading station longitudinally orients each successive ferrule on the basis of a reference notch cut into one ferrule edge.

13. The automated apparatus defined in claim 12, wherein said third means of said ferrule loading station includes a separate roller for independently rotating each ferrule of a ferrule pair on its axis, and a separate locating element bearing against the peripheral surface of each rotating ferrule of a ferrule pair, said locating elements becoming lodged in the C-shaped cutouts to arrest ferrule rotation with the ferrules of a ferrule pair angularly oriented with their central openings in confronting relation preparatory to the loading of the ferrule pair on the one of said ferrule fixtures thereat.

14. The automated assembly apparatus defined in claim 13, wherein one of said posts of each said ferrule fixture is mounted for movement between spaced and juxtaposed positions with respect to the other of said posts, and means for shifting said one post to said spaced position preparatory to the loading of a ferrule pair on said ferrule fixture by said loading station and shifting said one post to said juxtaposed position preparatory to the depositing of a spring into said cavity by said spring loading station.

15. The automated assembly apparatus defined in claim 14, wherein each said ferrule fixture includes a first actuator for positioning said spring positioning element and a second actuator for shifting said one post between said spaced and juxtaposed positions, and means coordinated with the indexing of said table for controlling the operations of said first and second actuators.

16. The automated assembly apparatus defined in claim 15, wherein said first and second actuator controlling means including a pair of stationary cams, a separate pair of cam followers carried by said table in predetermined positional relationship with each said ferrule fixture and riding on said cams, and separate control elements conditioned by each of said cam followers for controlling the operations of said first and second actuators of each said ferrule fixture.

17. The automated assembly apparatus defined in claim 15, wherein said spacer loading station includes a positioning table supporting said spacer fixture, and a transfer mechanism for picking said subassemblies from said ferrule fixtures successively presented thereat and placing said subassemblies in said assembly fixture at various locations determined by the positioning of said spacer fixture by said positioning table.

18. The automated apparatus defined in claim 17, wherein said spring capturing station includes means movable into bearing engagement with the upper edges of the fixture mounted ferrule pair thereat to sustain the axial positions of the ferrules on said posts during incremental rotations thereof by said manipulators.

19. The automated apparatus defined in claim 18, wherein said ferrule loading station includes means for restoring said manipulators of the one of said ferrule fixtures thereat to respective ferrule loading positions for accepting a ferrule pair loaded on said posts with the central openings thereof in confronting relation.

* * * * *

UNITED STATES PATENT AND TRADEMARK OFFICE
CERTIFICATE OF CORRECTION

PATENT NO. : 4,913,707

DATED : April 3, 1990

INVENTOR(S) : Pat F. Moreno, Robert H. Lewis, Robert G. MacIvergan, Harold B. King, Jr.

It is certified that error appears in the above—identified patent and that said Letters Patent is hereby corrected as shown below:

On the title page, item [21], "Appl. No.:  270,006" should read
--Appl. No.:  279,006--.

Signed and Sealed this

Fourteenth Day of May, 1991

Attest:

Attesting Officer

HARRY F. MANBECK, JR.

Commissioner of Patents and Trademarks